United States Patent Office 3,373,083
Patented Mar. 12, 1968

3,373,083
METHOD OF INHIBITING THE CORROSION OF GRAPHITE IN A $CO_2$-COOLED NUCLEAR REACTOR
Charles Koch and René Ranc, Grenoble, France, assignors to Commissariat à l'Energie Atomique, Paris, France
No Drawing. Filed May 16, 1966, Ser. No. 550,142
Claims priority, application France, June 9, 1965, 20,087
3 Claims. (Cl. 176—38)

ABSTRACT OF THE DISCLOSURE

The corrosion of graphite in a graphite moderated $CO_2$-cooled nuclear reactor is inhibited by adding about 0.2% by weight of $SiH_4$, $Si_2H_6$ or $Si(OC_2H_5)_4$ to the $CO_2$ coolant.

---

This invention relates to a method of inhibiting the corrosion of graphite in graphite-moderated $CO_2$-cooled nuclear reactors.

In such nuclear reactors there occurs graphite corrosion by the products of radiolysis of the carbon dioxide, with consequent loss from the moderator. This reaction has been known for some time, and the reaction speed seems to be connected with the temperature of the carbon dioxide gas in operation, the specific power (ratio of thermal power to volume of reactor core), the pressure of the carbon dioxide and the intensity of radiation (linked to specific power).

Since the specific powers in those reactors now in service are relatively small, graphite corrosion is low enough not to present a serious problem. However, the increased operating temperature, pressure and power planned for future reactors make it essential for this corrosion to be at least partially inhibited.

Various solutions have been proposed. Protection of the graphite with a coating of silica or pyrolytic carbon is expensive and not entirely satisfactory, since inhibition of corrosion by $CO_2$ outside reactors is not repeated during operation of the reactors, probably due to cracks formed in the coating. Metal cladding of the graphite blocks is generally undesirable because it is expensive and results in considerable neutron absorption.

Alternatively, the graphite used may be impregnated with chemical compounds such as phosphates, but the results of this impregnation are equally disappointing.

The best solution at present seems to be to add gaseous inhibitors which when mixed continuously or intermittently with the carbon dioxide reduce the rate of graphite corrosion. Inhibitors already used include carbon monoxide, hydrogen and methane. Carbon monoxide will only reduce graphite corrosion if large quantities of it are used, which may disturb the operation of the reactor, more particularly on account of deposits due to radiolysis of the carbon monoxide. Hydrogen, which also effectively slows down graphite corrosion, has the drawback of producing relatively large quantities of water which may corrode various parts of the reactor, particularly the heat exchangers. Methane, when used alone, only acts after a certain time, probably required for the appearance of intermediate products.

The object of the present invention is to provide a better method of inhibiting graphite corrosion than has been used before.

In the method according to the invention at least one inhibitor compound of at least silicon and hydrogen, which is gaseous at the reactor operating temperature, is added to the carbon dioxide coolant.

Several grounds make it necessary for the inhibitor compound to be gaseous at the lower temperature of the $CO_2$ coolant in the reactor cooling loop: but it is sufficient to note that the compound would condensate in the low temperature portions of the loop if the condition was not fulfilled.

Numerous compounds may be used, particularly silicon hydrides and silicon organic compounds; $SiH_4$, $Si_2H_6$, $Si(OC_2H_5)_4$ appear of particular interest. More generally, several compounds having a formula of the type $Si_nH_{2n+2}$ appear acceptable.

The proportions of inhibitor in the carbon dioxide may be variable—higher proportions are more effective—but obviously it is desirable to use the minimum proportion compatible with the effect required: 0.2% in weight are sufficient to provide satisfactory results in most cases.

The inhibitor compounds may be added continuously or intermittently and in various ways. If the inhibitor is added intermittently, the carbon dioxide is mixed with a certain quantity of inhibitor and then inserted, whereupon the inhibitor supply is cut off. The $CO_2$ coolant is then monitored to detect increase in the amount of CO which indicates that corrosion of the graphite has resumed. More inhibitor has to be inserted whenever there is an appreciable increase in corrosion, i.e. a loss of graphite, e.g. when the reactor is shut-down and started again or when there are changes of temperature, pressure or irradiation conditions. Automatic means may be provided for opening and shutting off the inhibitor feed whenever the CO content reaches a given value and indicates corrosion of the graphite.

Two comparative examples will now be described, showing the method according to the invention, with its advantages.

Example I

Two sets of flasks in quartz were irradiated at 60° C. under identical conditions. One set contained samples of graphite in an atmosphere of carbon dioxide at a pressure of 3 bars, and the other set samples of graphite of the same nature and geometry but in an atmosphere of carbon dioxide with 0.2% of $Si(OC_2H_5)_4$ at a pressure of 3 bars. The speed at which the graphite was corroded was five times slower in the flasks containing carbon dioxide with $Si(OC_2H_5)_4$.

Example II

Two sets of flasks in quartz were irradiated at 350° C. under identical conditions, one containing samples of graphite in an atmosphere of carbon dioxide at a pressure of 3 bars, and the other containing samples of graphite of the same nature and geometry in an atmosphere of carbon dioxide with 0.2% $Si(OC_2H_5)_4$ at a pressure of 3 bars. The graphite corrosion in the sealed flasks containing inhibitor was again five times less.

We claim:
1. In a method for inhibiting the corrosion of graphite in graphite-moderated $CO_2$-cooled nuclear reactors wherein carbon dioxide is circulated in a closed path in the reactor core and in the heat exchanger means with the carbon dioxide being at a minimum temperature at the outlet of the heat exchanger means, the step of adding to the carbon dioxide at least one chemical compound selected from the group consisting of $Si(OC_2H_5)_4$ and saturated silicon hydrides $Si_nH_{2n+2}$ which are gaseous at said minimum temperature.

2. In a method for inhibiting the corrosion of graphite in graphite-moderated $CO_2$-cooled nuclear reactors wherein carbon dioxide is circulated in a closed path in the reactor core and in heat exchanger means, the carbon dioxide being at a minimum temperature at the outlet of the heat exchanger means, the step of adding to the carbon dioxide at least one chemical compound selected from the group consisting of $SiH_4$, $Si_2H_6$, and $Si(OC_2H_5)_4$ which are gaseous at said minimum temperature.

3. A method as set forth in claim 2, wherein the content of inhibitor compound is of about 0.2% by weight.

References Cited

UNITED STATES PATENTS

| | | | |
|---|---|---|---|
| 3,335,062 | 8/1967 | Feates et al. | 176—92 |
| 3,108,051 | 10/1963 | Lindstrom | 176—38 |
| 3,294,644 | 12/1966 | Walton | 176—92 |

FOREIGN PATENTS

| | | |
|---|---|---|
| 1,402,257 | 5/1965 | France. |
| 917,820 | 2/1963 | Great Britain. |
| 997,209 | 7/1965 | Great Britain. |
| 1,013,102 | 12/1965 | Great Britain. |

L. DEWAYNE RUTLEDGE, *Primary Examiner.*